(No Model.)
L. SLOAN.
VESSEL FOR TRANSPORTING BREAKABLE GOODS.
No. 388,733. Patented Aug. 28, 1888.
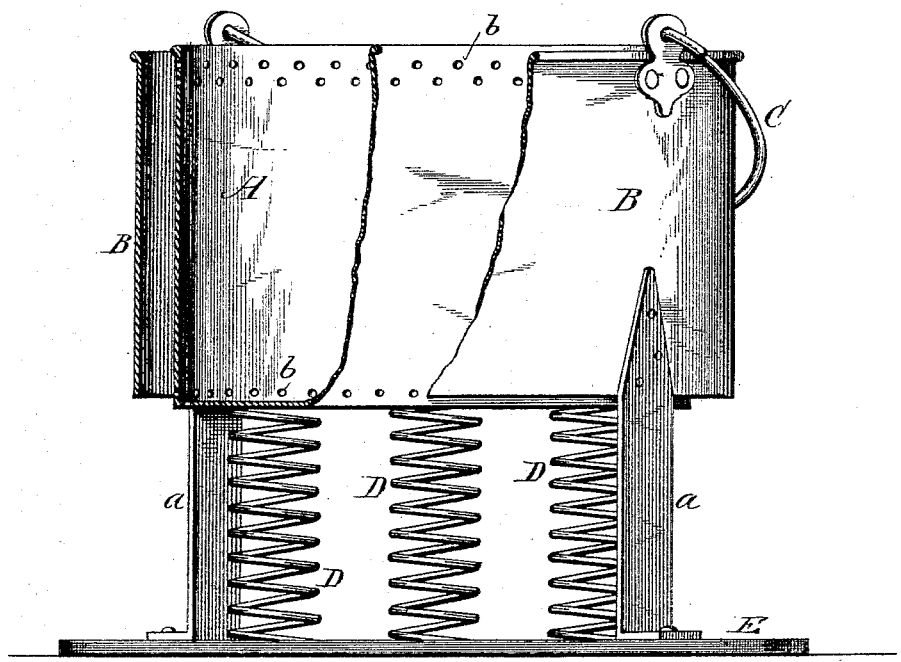
Witnesses,
Albert Breiden
C. N. Soutt
Inventor
Lina Sloan.
By her Attorney
Chas. H. Fowler

UNITED STATES PATENT OFFICE.

LINA SLOAN, OF WAUSAU, WISCONSIN.

VESSEL FOR TRANSPORTING BREAKABLE GOODS.

SPECIFICATION forming part of Letters Patent No. 388,733, dated August 28, 1888.

Application filed May 29, 1888. Serial No. 275,487. (No model.)

*To all whom it may concern:*

Be it known that I, LINA SLOAN, a citizen of the United States, residing at Wausau, in the county of Marathon and State of Wisconsin, have invented certain new and useful Improvements in Vessels for Transporting Breakable Goods; and I do hereby declare that the following is a full, clear, and exact description of the same, reference being had to the annexed drawing, making a part of this specification, and to the letters and figures of reference marked thereon.

The present invention has for its object to provide a safety-vessel adapted for the transportation of breakable goods—such as eggs, crockery, &c.; and the invention consists in the several details of construction, substantially as shown in the drawing and hereinafter described and claimed.

In the accompanying drawing, which represents a side elevation of my invention, partly in section, A represents the vessel, of any suitable shape and size, surrounded by an outer casing, B, which acts as a guard to prevent the vessel from swaying or rocking too far in a lateral direction, said casing being provided with a bail, C; and the vessel, if desired, may have a suitable cover.

The vessel A is supported upon suitable spiral springs, D, attached at their upper ends to the under side of the vessel, and their lower ends connected to a wide base, E, either circular or other shape, and of greater diameter than the diameter of the casing and vessel, so as to form a substantial support to prevent the device from tipping over.

The casing B is connected to the base E by standards $a$, so that said casing will be supported some distance above the base to surround the vessel, in order to protect it from contact with any object, and also to substantially hold it in an upright position or prevent it from swaying sidewise too far when being transported on the cars or other vehicle.

The springs may be of any well-known form, and their purpose is to take off of the vessel any sudden jar or shock that might occur thereto while being transported.

The vessel is provided with perforations $b$ near its top and bottom, through which may be passed cords or strings to tie or secure the articles therein when the vessel is being transported over rough roads. The lower edge or bottom of the interior vessel is normally below the bottom edge of the casing and the upper edge above the upper edge of said casing, and this, in connection with the open space between the standards $a$, affords ready access to the openings $b$ for the purpose of tying the cords. Where the surrounding casing is a closed vessel for its entire length or depth, the openings at the bottom could not be gotten at.

Having now fully described my invention, what I claim as new, and desire to secure by Letters Patent, is—

A transporting-vessel comprising a casing, a bail to said casing, a support for the casing, including a base of greater diameter than the casing, and standards, and an interior vessel moving loosely within the casing, mounted on springs resting on the base, with its bottom normally below the bottom edge of the casing, and said interior vessel provided with apertures at top and bottom for tying cords, all substantially as shown and described, and for the purpose specified.

In testimony that I claim the above I have hereunto subscribed my name in the presence of two witnesses.

LINA SLOAN.

Witnesses:
CARL H. MUELLER,
C. M. LEIDHOLDT.